Figure 1:
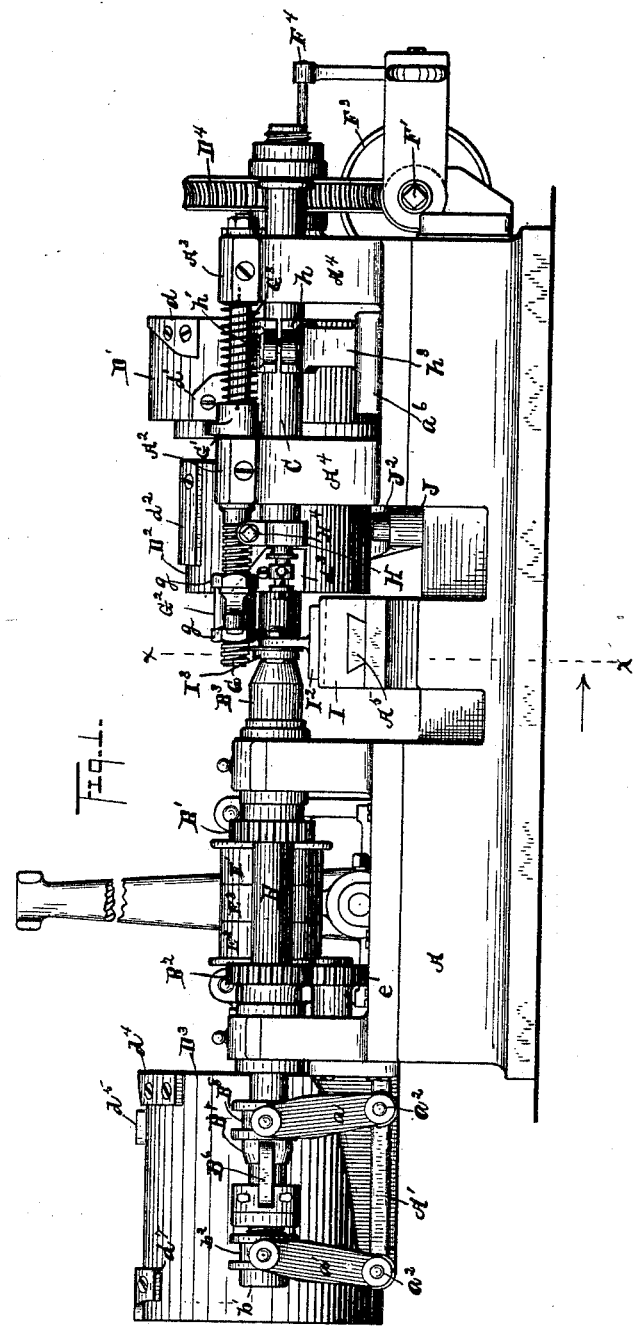

(No Model.)  3 Sheets—Sheet 1.

J. B. CLYNE.
MACHINE FOR MANUFACTURING SCREWS.

No. 497,766.  Patented May 23, 1893.

WITNESSES.
Belle S. Lowrie
A. S. Lowrie

INVENTOR.
James B. Clyne
By Geo. W. King. ATTORNEY.

(No Model.) 3 Sheets—Sheet 2.
J. B. CLYNE.
MACHINE FOR MANUFACTURING SCREWS.
No. 497,766. Patented May 23, 1893.
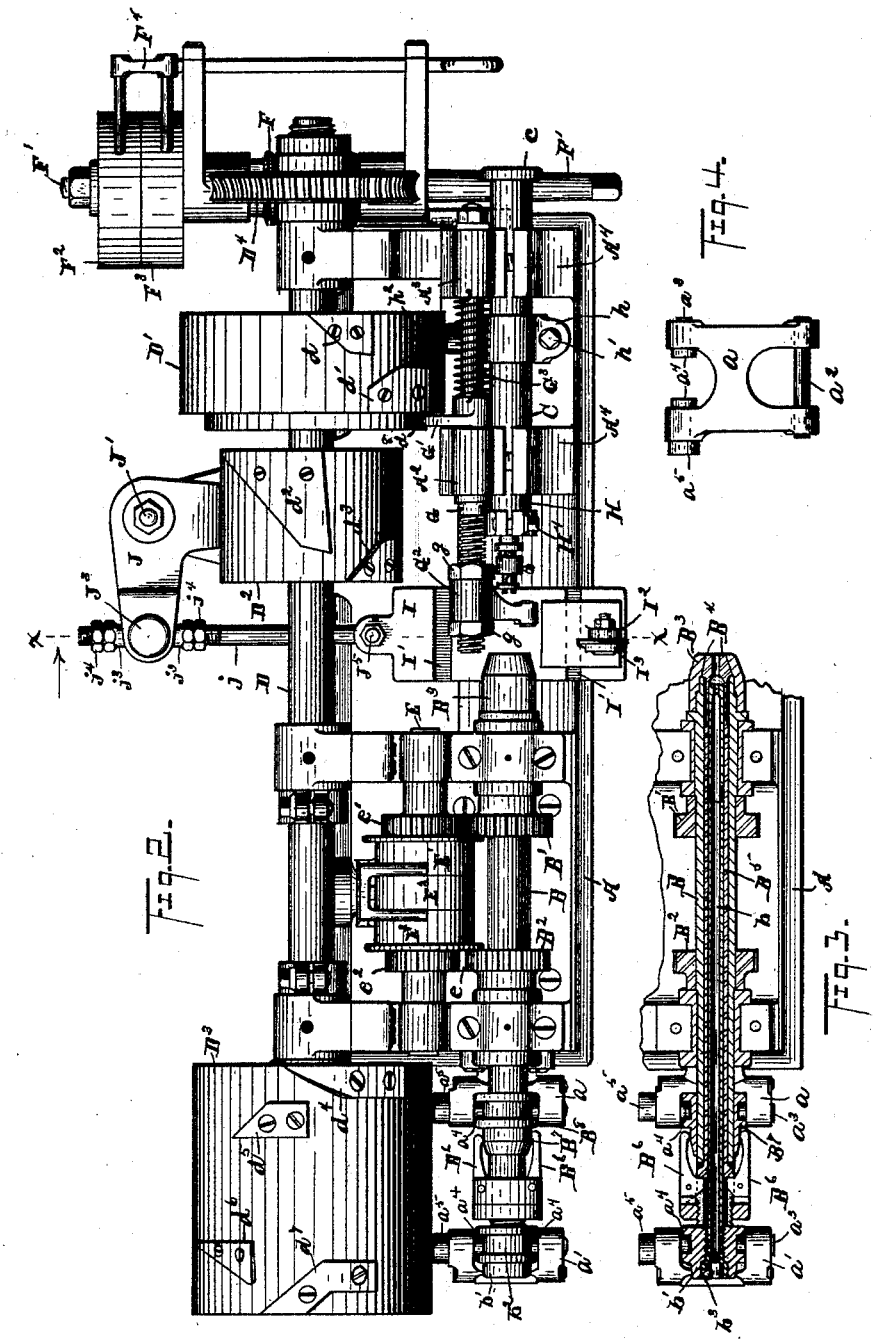
WITNESSES
Bell S. Lowrie
A. S. Lowrie
INVENTOR.
James B. Clyne
By Geo. W. King, ATTORNEY (No Model.)  3 Sheets—Sheet 3.
J. B. CLYNE.
MACHINE FOR MANUFACTURING SCREWS.
No. 497,766.  Patented May 23, 1893.
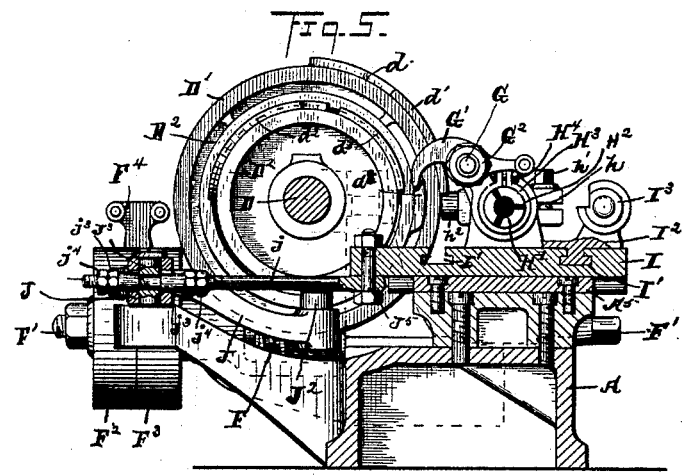
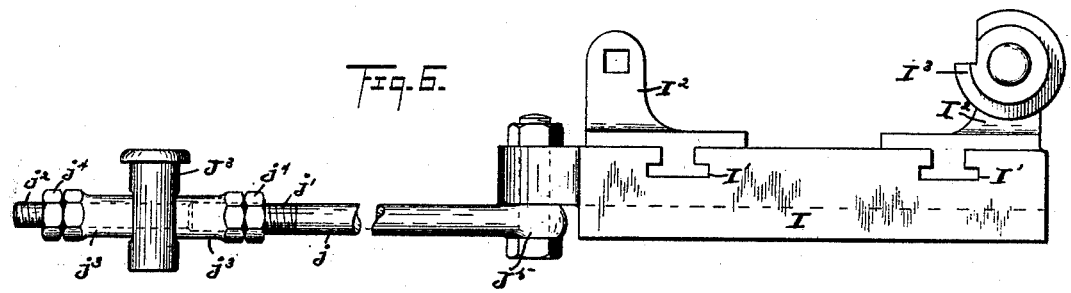
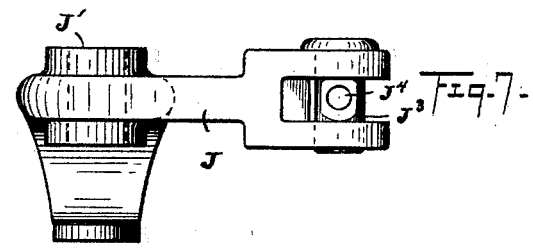
WITNESSES
Belle S. Lowrie
A. S. Lowrie
INVENTOR.
James B. Clyne,
By Geo. W. King, ATTORNEY.
THE NORRIS PETERS CO., PHOTO-LITHO., WASHINGTON, D. C.

UNITED STATES PATENT OFFICE.

JAMES B. CLYNE, OF CLEVELAND, OHIO, ASSIGNOR TO THE CLEVELAND MACHINE SCREW COMPANY, OF SAME PLACE.

MACHINE FOR MANUFACTURING SCREWS.

SPECIFICATION forming part of Letters Patent No. 497,766, dated May 23, 1893.

Application filed January 3, 1893. Serial No. 457,024. (No model.)

*To all whom it may concern:*

Be it known that I, JAMES B. CLYNE, of Cleveland, in the county of Cuyahoga and State of Ohio, have invented certain new and useful Improvements in Machines for Manufacturing Screws, &c.; and I do hereby declare the following to be a full, clear, and exact description of the invention, such as will enable others skilled in the art to which it pertains to make and use the same.

My invention relates to improvements in machines for manufacturing for instance machine screws, and it consists in certain features of construction and in combination of parts, hereinafter described and pointed out in the claims.

This machine although nominally a screw machine, is well adapted to manufacturing a great variety of small articles such as studs, pins, milled rivets, rollers, &c., used in constructing bicycles, sewing machines and in other industries.

In the accompanying drawings Figure 1, is a side elevation of a machine embodying my invention. Fig. 2, is a plan of the same. Fig. 3, is a horizontal central section taken through the live spindle. Fig. 4, is a side elevation in detail of an oscillating arm hereinafter more fully described. Fig. 5, is an elevation in transverse section taken on line $x$-$x$, Fig. 2. Fig. 6 is an enlarged side elevation in detail of the cross slide and attachments. Fig. 7, is an enlarged rear elevation in detail of lever J. Fig. 8, is an enlarged elevation in central section of pin $J^3$.

A represents the bed of the machine, B, the live spindle, C, a reciprocating tool stock set in line with spindle B, and D, is the cam shaft, the latter bearing drums $D'$, $D^2$, and $D^3$, to which drums various cams are removably attached, various shaped cams being employed according to the work being wrought on the machine.

$D^4$, is the worm gear for driving shaft D, gear $D^4$, engaging a worm F, this worm being mounted on the lateral shaft $F'$. The tight and loose band wheels $F^2$, and $F^3$, and the belt shifter $F^4$, will be readily understood without further mention.

E, is a stationary bar, and $E'$, $E^2$ and $E^3$ are band wheels of the same diameter and arranged side by side as shown, the latter being a loose pulley journaled directly on bar E. Wheels $E'$ and $E^2$ are respectively mounted on, and rigidly secured to the hubs of pinions $e'$, $e^2$, these pinions being journaled on bar E. Pinion $e'$, engages gear $B'$, of the spindle. Pinion $e^2$, engages an intermediate pinion $e$, and the latter in turn engages gear $B^2$ of the spindle. With such construction it is evident that in shifting the driving belt from one extreme band wheel ($E'$, $E^2$) to the other, the spindle will reverse, and that the spindle will remain at rest while the belt is on the idle pulley $E^3$. I have already made this reversing mechanism, just described, the subject of an application for Letters Patent of the United States.

Spindle B is provided with the well known chucking and feeding mechanism that may briefly be described as follows: The forward end of the spindle is provided with a removable cap $B^3$, having an internal conical bore into which bore the forward end of the chuck jaws $B^4$ are thrust to close the jaws upon the blank. For thus actuating the chuck jaws is provided sleeve $B^5$, and bell crank levers $B^6$, arranged in the order shown in Fig. 3, the sleeve abutting the rear end of the chuck jaws, and the inner ends of levers $B^6$, engaging the rear end of the sleeve. For expanding the outer end of levers $B^6$ is provided a sleeve $B^7$, the latter being adapted to move endwise on the spindle, this sleeve having a conical rear end. This sleeve has a circumferential groove $B^8$, for engaging the forked levers or arm that is supposed to actuate this sleeve. The bore of sleeve $B^5$ and the bore of the chuck jaws to near the forward end of the jaws are large enough to accommodate loosely the feeding tube $b$. This tube is constructed much like the chuck jaws, that is to say, the forward end of the tube is bored to fit the blank snugly and this end of the tube is split so that normally the tube grasps the blank, with sufficient force to move the blank endwise for feeding purpose, although it requires but little extra force to slide the tube along the blank, provided the blank be held stationary, as by the grasp of the chuck jaws. From near the forward end of the tube, and from thence rearward, the balance of the tube is bored to receive the blank loosely. The rear end of tube $b$ outside the spindle, is provided with a removable head $b'$, this head being secured to the end of the tube by means of a driving fit, or otherwise if preferred, and this head has a circumferential groove $b^2$ for engaging the forked arm or lever, that is supposed to actuate the feed tube. I may remark that the feed and chuck mechanism thus briefly described is employed on most of the mechanism of this class, but such mechanism has usually been operated by means of hand levers.

To render this machine as nearly automatic as possible in all of its functions, so as to reduce to the minimum the labor of attending the machine, I have devised as follows: Forked rock arms $a$, $a'$, are provided and as these arms may, and are supposed to be alike, Fig. 4 would represent a side elevation of either of them. Each rock arm is fulcrumed on a lateral pin $a^2$, such pin engaging an attachment $A'$, of the bed. The free ends of these rock arms near the extremes of their prongs are pierced to receive pins, one of which is shown at $a^3$, Fig. 4. On the inner ends of these pins are journaled rollers $a^4$ for operating in pairs respectively, in grooves $B^8$ and $b^2$ aforesaid. The one pin projects rearward of the arm and on this projecting end of the pin is journaled roller $a^5$, the roller $a^5$ of the one rock arm, being engaged by cams $d^4$, $d^5$ and roller $a^5$ of the other rock arm being engaged by cams $d^6$, $d^7$, these four cams being detachably secured to the periphery of the drum $D^3$. The action of these cams intermittently oscillates these rock arms, that in turn, actuate the chuck jaws and feeding tube, the arrangement being such that while the chuck jaws are grasping the blank, the feeding tube is being reversed, or backed, and when the chuck jaws open, the feeding tube is removed forward to feed the blank. The throw of tube $b$, is supposed to be ample for the purpose, and the blank engages a stop, whereby the length of the work is accurately gaged. To relieve the rear end of tube $b$ from internal wear, such as would be caused by engagement with the blank, I insert a hardened steel bushing $b^3$, in head $b'$, just at the rear end of tube $b$, the bore of this bushing being preferably a trifle smaller than the bore of the adjacent end of the tube, but still large enough to pass the blank easily.

The stop mechanism before referred to is as follows: G is a rock shaft that is journaled in holes in members $A^2$, $A^3$, these members being attachments of the bed. On shaft G are mounted lateral arms $G'$, $G^2$ and a coiled torsion spring $G^3$. Arm $G^2$ is mounted on the overhanging, rear, screw threaded end of shaft G with jamb nuts $g$, $g$, arranged on either side of the arm so that the latter can be adjusted lengthwise shaft G by manipulating these nuts. When this arm is turned down, the free end thereof is in position in front of the chuck jaws, and serves as a stop for the blank, to gage the length of the work. Arm $G'$ is of the curved variety shown in Fig. 5 and once in a revolution of drum $D'$ the inner curved force of arm $G'$ is engaged by the undercut end of cam $d^8$ by which engagement shaft G is actuated whereby stop $G^2$ is turned down into position in front of the chuck jaws. As cam $d^8$ moves onward and becomes disengaged from arm $G'$, shaft G is reversed by the recoil of spring $G^3$. By means of arm $G'$ being curved as shown, and of the engaging end of cam $d^8$ being undercut, it is evident that the arm, by engagement with the cam, is moved through a given arc quicker than if the face of the arm were straight, and the special object of the construction shown is to move the stop into and out of working position quickly, so that there will be as little loss of time as possible between the discharge of one piece of work and the advance of the tools to engage the next piece of work.

H is the tool stock, the same being constructed of a cylindrical bar of metal that is adapted to reciprocate endwise through boxes $A^4$, $A^4$ and this stop is supposed to be in line with spindle B. The end of member H, next the chuck, has a central bore as at $H'$, for receiving the tools, and this end is slitted as at $H^2$ to render it compressible, and a split collar $H^3$, is mounted thereon, this collar having a clamping bolt $H^4$, and by tightening this bolt, the split section of the tool stock is made to grasp the tool as firmly, and to hold the tool as accurately in line with the work, as if the tool were inserted with a driving fit. By loosening bolt $H^4$ the tool, can be easily removed. On the tool stock is mounted another split collar $h$, the latter having a clamping bolt $h'$. On a pin projecting rearward from the collar is journaled a roller $h^2$ for engaging cams $d$, $d'$, of drum $D'$ by which engagements the tool stock is actuated toward and from the work. Cams $d$, $d'$, are detachable, so that they can be replaced by other cams, when the nature of the work requires a change. Collar $h$ has a depending arm $h^3$, the free end of this arm operating in a groove constructed in, and lengthwise the top side, of block $a^6$, by means of which the tool-stock is held from turning on its axis. Block $a^6$ is a member of the bed.

$A^5$ is a lateral way, rigid with the bed, and on this way operates the cross slide I, the latter being provided, near either end, with undercut grooves as at $I'$, for attaching tool posts $I^2$, so that, if desired, a tool can be set on either side of the work so as to be operated by reverse movements of the cross slide.

In Fig. 5 is shown attached to one of the tool posts, a well known variety of circular tool $I^3$, that may be used to advantage on some kinds of work.

For operating the cross slide I provide as follows: J is a lever of the bell-crank variety, fulcrumed at $J'$. The lateral arm of this lever extends forward and curves downward (see Figs. 5 and 7) so that the forward end thereof, is directly under drum $D^2$, where the lever is provided with a roller $J^2$ for engaging cams $d^2$, $d^3$ of this drum, by which engagement lever J is actuated alternately in reverse directions. The other extreme of the lever is forked (see Fig. 7) and the prongs thereof are bored vertically to receive with an easy fit, pin $J^3$, so that this pin can oscillate in its seat. This pin is of considerable size, and it has a lateral hole $J^4$ midway between the prongs of the lever, through which lateral hole extends rod $j$, with an easy fit. Rod $j$ is screw threaded on either side of pin $J^3$, as at $j'$ and $j^2$, the latter screw threaded section being a trifle reduced in size. Between these screw-threaded sections the rod is smooth, so as to slide freely through the hole $J^4$. Mounted on the rod, on either side of the pin, are sleeves $j^3$, $j^3$, and these are backed by jamb nuts $j^4 j^4$. The sleeves are bored from their inner ends to fit the smooth section of the rod adjacent pin $J^3$, while the outer ends of the sleeves are screw threaded internally to engage, respectively, the screw threaded section of the rod. The latter is pivoted at $J^5$ to slide I. The arrangement of parts is such that the maximum throw of the cross-slide is ample for the purposes thereof, and this throw can be reduced by means of lost motion as between pin $J^3$ and sleeves $j^3$. A tool borne by one of the tool posts $I^2$, will likely be employed to size down the work, or some portion of the work to a predetermined standard gage, and likely an advanced point of the same tool, may, at the same time be employed in cutting off the piece of work that had been finished. Where the work is of a complicated nature, two tools would be employed, in which case each tool post would bear a tool.

From the foregoing it will be understood that the terminus of the advance of a tool must be gaged with nicety. This is done by manipulating sleeves $j^3$, for it will be seen that the position on rod $j$ of the sleeve $j^3$, that is at the rear of pin $J^3$, will determine the distance that the tool is advanced, that is borne by the tool post in front of the work; and in like manner the position of the sleeve $j^3$, that is in front of pin $J^3$, will regulate the advance of the tool that is located at the rear of the work.

I will here mention some of the advantages that I claim for the construction just described, over machines of this class, where the mechanism for operating the cross slide is located partly, or entirely below the bed. With my improved construction the cross slide, rod $j$, and lever J are all supposed to operate in the same horizontal plane. Hence, there is no liability of cramping, or binding, as between the different members. Also sleeves $j^3$ are at the rear of the machine where they are conveniently accessible and hence they may be readily adjusted, even while the machine is running. And what is of great importance, pin $J^3$ and sleeve $j^3$ are back, out of the way of chips and particles discharged from the cutting tool or tools, for if a chip or particle, however small, happens to find lodgment between pin $J^3$ and one of sleeves $j^3$, in would vary and spoil the piece of work.

I am aware that many of the elements of this machine have, in one way or another, been used in constructing machines of this class, but it is believed that this machine embodies various new combinations of these elements, that subserve a useful purpose, and, in fact, mark a material advance in the art.

What I claim is—

1. In machine of the class indicated in combination, live spindle bearing a chuck, a rock shaft bearing an arm operating perpendicular to the axial line of the spindle, and bearing a second arm having an inwardly curved face, a cam in position to engage such curved arm, the engaging end of such cam being undercut, substantially as and for the purpose set forth.

2. In a machine for manufacturing screws in combination, a cross slide and a bell-crank lever for operating the same; cams for operating the bell-crank lever, a rod pivoted to the cross slide, such rod extending through a lateral hole in a vertical pin, such pin being journaled in the bell-crank lever abutment sleeves and jam nuts mounted on the connecting rod and arranged either side of the vertical pin for regulating the throw of the cross slide according to the lost motion had by adjusting the abutment sleeves, substantially as described.

In testimony whereof I sign this specification, in the presence of two witnesses, this 28th day of December, 1892.

JAMES B. CLYNE.

Witnesses:
  G. P. NASH,
  I. HOLM.